Patented June 12, 1945

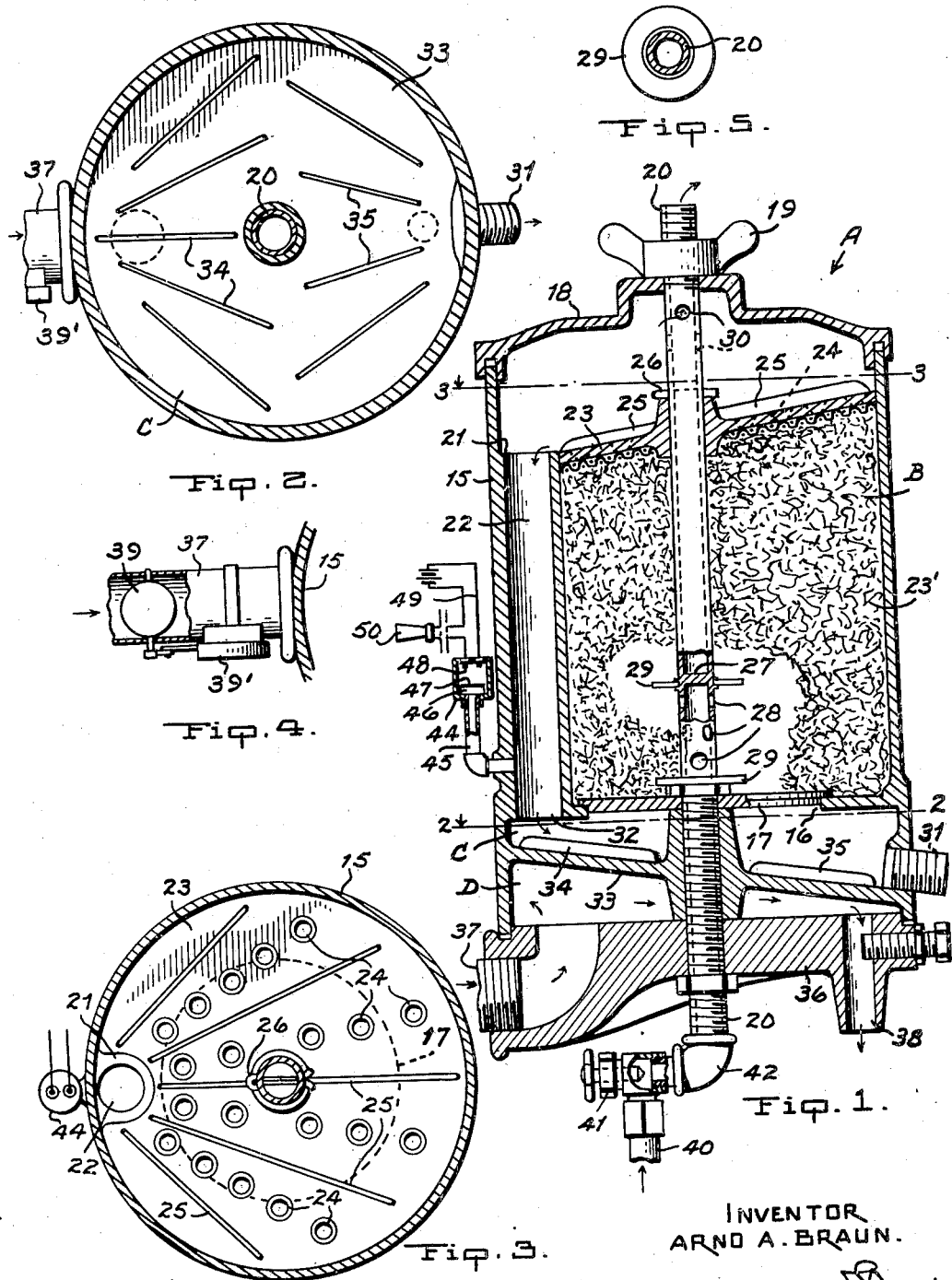

2,377,988

UNITED STATES PATENT OFFICE 2,377,988

OIL RECLAIMING DEVICE

Arno A. Braun, Winnipeg, Manitoba, Canada, assignor to Universal Oil Reclaimer Company, Limited, Winnipeg, Manitoba, Canada, a corporation of Manitoba, Canada Application October 27, 1941, Serial No. 416,730

6 Claims. (Cl. 210—122.5)

This invention relates to oil reclaiming devices and has more particular reference to devices of this nature which are designed primarily for operative purposes in connection with the internal combustion engines of motor vehicles such as motor cars, trucks, tractors, Diesels and the like.

Ordinarily, oil employed as a lubricating medium for the operatively moving parts of internal combustion engines has a limited useful life as a lubricating medium for the reason that during the normal operation of a motor vehicle, the lubricating oil becomes contaminated with gasoline, distillates, water condensate, carbon, road dust and other objectionable influences which, after a relatively short period of time, reduce the efficient lubricating properties of the oil to such an extent that it is unable to perform its normally intended functions in a proper manner. As a result of the entry of these foreign materials and particles into the oil, bearing parts and wearing surfaces are subjected to uneven and excessive wear and abuse which causes the frictional and moving parts to become worn, noisy, loose and inefficient and eventually results in engine power losses, requires supplementary and change of oil at frequent intervals and replacement of worn parts all of which means lay-ups, loss of time, operational loss, inefficiency and added unnecessary expense in the operation of the motor vehicles.

It is one of the contemplated objects of the present invention then to provide a device of this character which may conveniently be attached to or near any type of motor vehicle or engine and overcome the aforementioned difficulties and disadvantages by reclaiming waste oil during the normal operation of motor vehicles or internal combustion engines.

Another object of the invention is the provision of means which utilizes the heat of the spent gases of combustion for driving-off volatile constituents and water vapors which may become entrained in the oil during operation.

A further object of the invention is to provide a device of this character wherein waste oil employed as a lubricant is successively subjected to filtration and distillation during the normal operation of a motor vehicle or engine.

A still further object of the present invention is to provide a device of this character wherein the heat of distillation is so controlled that waste oil passing through the distillation chamber zone is not destructively distilled.

Yet a further object of the invention is to provide a device of this character wherein means are provided to cause the waste oil to be spread evenly and in a relatively thin film over the surface of the distillation chamber and wherein the solids carried in suspension in the waste oil are removed by filtration prior to distillation.

Other and additional objects and advantages of the invention will become apparent as the description proceeds and the novel features of the invention becomes known and I now proceed with the description of the invention in detail which is illustrated in the accompanying drawing in which;

Fig. 1 is a longitudinal sectional elevation of an embodiment of the present invention.

Fig. 2 is a section taken on the line 2—2 of Fig. 1.

Fig. 3 is a section taken on the line 3—3 of Fig. 1.

Fig. 4 is a sectional plan view showing thermostatically operated control means for regulating the temperature of the heat chamber, and Fig. 5 is a section taken through the center of the supporting member or stem showing the baffle means for spreading the waste oil as it is introduced into the filtering material.

In the accompanying illustration of the present invention, the principal unit sections of the device are identified by similar letter characters of reference while the details of the invention will be found by reference to the numerical characters. In the drawing then the letter A designates the oil reclaiming device as a whole which may be supported in operative position in any convenient manner and includes a filtration chamber B, a distillation chamber C and a heat chamber D. If it is found desirable or necessary in the manufacture, assembly, dismantling, cleaning or otherwise, the oil reclaiming device may be constructed in separate sections however it is not to be understood that such sectional construction implies restriction since modified structural means may be employed within the purview and spirit of the invention.

The filtration chamber designated by the letter B comprises a housing or casing 15 preferably cylindrical in form provided with a bottom wall which is formed with an opening 16 sealed as by a plate or closure cap 17 and an open top, the open top being closed by suitable cover means 18 detachably secured in position by means of a thumb screw or the like 19, the latter of which is connected to a combination supporting member or stem and feed pipe 20 which will later be referred to.

Formed integral with the cylinder wall 15 and within the filtration chamber is a boss 21. This boss extends from adjacent the top of the filtration chamber to the bottom wall thereof and is provided with a passageway 22 which extends therethrough and through the bottom wall of the filtration chamber to form a means of establishing a communicating passageway between the upper section of the filtration chamber and the distillation chamber C.

Mounted within the filtration chamber and in spaced relationship to the cover member 18 and adjacent the upper extremity of the passageway 22, is the baffle plate or member 23. This baffle member, as clearly observed in Fig. 1, is designed to be disposed at an angle to the horizontal sufficient to impel liquids thereon to flow in a common direction and toward the inlet of the passageway 22.

The baffle member 23 encloses a suitable filtering medium 23' such as cotton waste, cotton wool or the like in the filtering chamber proper and as particularly observed in Figs. 1 and 3 is provided with a plurality of outlet openings 24 and a series of grooves or rib members 25, the baffle member being detachably retained in position by suitable means such as a pin or the like 26. The grooves or rib members aforementioned are designed to converge toward a common point and in the direction of the communicating passageway 22. Thus filtered liquids from the filtering zone pass upwardly through the openings 24 of the member 23 and then flow downwardly over the surface of the baffle member to the passageway 22 from whence they pass downwardly to the distillation chamber, the latter operation of which will again be referred to.

In accordance with the disclosure herein the supporting stem and feed pipe 20 is hollow and is preferably disposed centrally of the device and serves the purposes of providing means for delivering waste oil to the center of the lower sectional area of the filtering medium, a means of carrying-off the volatile gases and water vapors driven from the waste oil and a means of providing convenient means for replenishing the filtering material or dismantling or otherwise. Substantially midway of its length, the member 20 is provided with a dividing wall 27 which subdivides the stem into upper and lower non-communicating sections. Adjacent the dividing wall 27 I provide the lower section of the member 20 with a series of outlet openings 28 which form a means for delivering waste oil to the lower central section of the filtering medium.

Above and below the openings 28 of the member 20, I provide a series of baffle means in the form of fiber washers or the like 29. The purpose of these baffle members is to prevent oil from flowing directly upward following the path of the member 20 or downwardly toward the base of the filter chamber and to cause the oil introduced into the filtration chamber to spread and disperse evenly throughout the filtering medium. Adjacent its upper extremity yet within the housing 15 and above the baffle member 23, the member 20 is provided with a series of outlet openings 30 which are designed to provide outlet means for water vapors and volatile gases issuing from the distillation chamber as will be later referred to.

The distillation chamber C is preferably disposed immediately beneath the filtration chamber B but may be otherwise disposed. Outlet means 31 and inlet means 32 permit the withdrawal and introduction of liquids respectively from and to the distillation chamber, the latter, as previously mentioned, establishing communication as between the filtration chamber and the distillation chamber. The upper surface of the wall 33 of the distillation chamber C is disposed at an angle to the horizontal sufficient to impel liquids thereon to flow in a common direction and toward the outlet 31 at a rate of flow that will enable and permit all liquids passing over its surface to be subjected to heat treatment. Additionally, the upper surface of the wall 33 is provided with a series of oppositely disposed grooves or rib members 34 and 35 respectively, the former of which may be described as radiating from a common point or center and the latter as converging toward a common point in the distillation chamber. It is well to observe here that while the initial flow of oil from the filtration chamber to the passageway 22 is from the low level of the baffle member 23, the flow from the passageway 22 is directed to and first contacts the high or peak elevational level of the surface of the distillation chamber.

Primarily, the purpose of the rib members 34 and 35 is to cause and to maintain an even disposition of a relatively thin film of oil over the entire surface of the distillation chamber, first by gradually spreading the oil evenly over such surface by means of the members 34 and then by gradually converging the flow of oil toward the common outlet 31 by means of the members 35, the rate of flow insuring that all oil or other liquids passing through the distillation chamber will be subjected to proper heat treatment. Finally, the oil or liquids pass through the outlet means 31 from whence they are returned to the crank case or sump of an internal combustion engine (not shown), or other receptacle means.

I have herein described and illustrated an opposed arrangement of rib members for the distillation chamber which is designed to effect an even spread and disposition of oil over the surface of the distillation chamber and to cause it to converge its flow in the direction of a common outlet however it will be understood that the members 35 may be dispensed with without departing from the spirit or the essential characteristic of the present disclosure. Further, while grooves or rib members are herein referred to, the latter is preferable since protruding rib members of the fin type characteristically form a means of heat transfer and radiation within the distillation chamber.

Immediately below the distillation chamber C is the heat chamber D. This latter chamber is provided with a closure cover member 36 which in turn is provided with inlet means 37 connectable in any suitable manner with a heat producing medium such as the exhaust means of an internal combustion engine, and an outlet 38 which is designed to establish communication as between the heat chamber and the atmosphere.

In order to obtain a maximum amount of efficiency it is desirable and necessary to maintain a proper heat temperature in the distillation chamber. I therefore provide temperature regulating means for controlling the temperature range within the heat chamber. The means herein exemplified comprise a damper or valve member 39 which is conveniently mounted in the inlet 37 and operatively controlled by means of a thermostat 39'. Thus during operation the heat responsive thermostat will automatically operate the valve or damper to regulate the heat units admitted to the heat chamber which in turn controls the temperature range of the distillation chamber. In the event substitute heat control means are conditionally found desirable, the outlet opening 38 may be provided with adjustable outlet closure means such as an adjusting screw so as to control the rate of passage of heat medium through the heat chamber.

Means for conducting waste oil from the crank case and delivering it to the filtration chamber B comprises conduction pipe 40 connected through control valve 41 and fitting 42, the latter being connected directly to the lower extremity of the lower section of the pipe member 20.

If for any reason there should be an overflow of oil in the device, I provide operative signal means, preferably arranged adjacent the distillation chamber, which causes an audible signal to be sounded when an overflow occurs. The signal device herein illustrated comprises a casing 44 connected by pipe means 45 with the lower section of passageway 22 or it may be connected at any suitable point along the path of flow of the returning oil. This casing is provided with a float 46 having a metal conductor 47 thereon while terminals 48 are connected through wiring 49 with a type of signal device 50. Thus when an oil overflow occurs, float 46 moves upwardly causing conductor 47 to contact the terminals 48 to close the circuit and sound the alarm signal.

Operation

Waste oil from the crank case of an internal combustion engine or other source is delivered to the oil reclaiming device through the member 40 and its flow is controlled by means of the valve member 41. The waste oil then passes upwardly through the lower section of hollow member 20 and is discharged from the outlet openings 28 into the lower central section of the filtering medium 23′. As the oil moves upwardly or downwardly in its immediate vicinity under delivery pressure, a direct flow is impeded and the oil is caused to be dispersed outwardly in an even manner throughout the filtering material by the baffle arrangement 29 and as a result the solids and other particles carried in suspension in the oil are thoroughly and positively removed by filtration. As the filtered oil reaches the baffle plate 23 it flows through the outlet openings 24 and onto the surface of the plate and then due to the angular disposition of the surface, flows in the direction of the passageway 22, the rib member 25 causing such flow to converge toward the common outlet and from this point the filtered oil flows downwardly and into the distillation chamber C.

Here it is again emphasized that the filtered oil flowing into the distillation chamber first contacts the high or peak elevational level of the surface of the wall 33 of the distillation chamber. From the point of first contact of the oil introduced into the distillation chamber, the oil commences to spread itself in a relatively even thin film over the entire surface inclination of the wall 33 by means of the members 34, eventually flowing to the outlet connection 31 from whence it is returned to the crank case of an internal combustion engine or other receptacle in reclaimed form and of substantially its original clarity and viscosity.

During its passage over the surface of the distillation chamber, the filtered oil within the chamber is subjected to the controlled temperature of the heat chamber D which is designed to develop a temperature range within the distillation chamber sufficient to drive-off the volatile constituents and water vapors from the oil and yet is within a temperature range that will not effect destructive distillation.

The volatiles and water vapors driven from the oil pass through the outlet openings 32 and upwardly through the passageway 22 into the upper section of the housing where through the openings 30 in the upper section of the pipe 20 they pass outwardly direct to the atmosphere.

Should an oil overflow occur in the device, oil will flow through the pipe connection 45 into the chamber 44 and cause the float 46 and metal member 47 to move into contact with the terminals 48 to close the circuit and sound the signal alarm.

The embodiment of the invention disclosed represents a new, novel and practical development in the art of oil reclaiming devices and while I have illustrated and described one form of device for this purpose, it will be understood that the invention may be embodied in other specific forms without departing from the spirit or essential characteristics of the invention. It is intended therefore that the present disclosure is illustrative rather than restrictive and that all changes coming within the meaning and range of equivalency of the claims are intended to be embraced therein.

What I claim as my invention is:

1. In a device of the character described, a housing provided with dividing wall structure defining a filtration chamber with a distillation chamber and a heat chamber therebeneath, the said filtration chamber being provided with a passageway communicating with the filtration chamber and the distillation chamber, the said distillation chamber having its surface arranged at an angle to the horizontal sufficient to impel liquids thereon to flow in a common direction, closure means for the filtration chamber provide with outlet openings, the said closure means being arranged at an angle to the horizontal sufficient to impel liquids thereon to flow toward the outlet passageway, filtering means for the filtration chamber, conducting means provided with a partition wall for delivering waste liquid and discharging it into the center of the filtering means and for conducting volatile gases to the atmosphere, outlet means for withdrawing reclaimed liquids from the distillation chamber, means for conducting a heat medium to the heat chamber and discharging it therefrom and means within the distillation chamber for causing liquids introduced thereinto to spread evenly over the surface of the distillation chamber in a relatively thin film.

2. In a device of the character described, a housing member provided with dividing wall structure defining a filtration chamber with a distillation chamber and a heat chamber respectively therebeneath, the said filtration chamber being provided with a passageway establishing communication between the filtration chamber and the distillation chamber, the surface of the distillation chamber being arranged at an angle to the horizontal sufficient to impel liquids thereon to flow in a common direction, filtering material within the filtration chamber, conducting means for delivering waste liquids to the filtration chamber, outlet means for withdrawing reclaimed liquids from the distillation chamber, means within the distillation chamber for causing liquids introduced thereinto to spread evenly over the surface of the distillation chamber in a relatively thin film comprising a series of protruding rib members and means for conducting a heat medium to and from the heat chamber.

3. In a device of the character described, a housing member provided with dividing wall structure defining a filtration chamber with a distillation chamber and a heat chamber respectively therebeneath, the said filtration chamber being provided with a passageway establishing communication between the filtration chamber and the distillation chamber, the surface of the distillation chamber being arranged at an angle to the horizontal sufficient to impel liquids thereon to flow in a common direction, filtering material within the filtration chamber, conducting means for delivering waste liquids to the filtration chamber, outlet means for withdrawing reclaimed liquids from the distillation chamber, means within the distillation chamber for causing liquids introduced thereinto the spread evenly over the surface of the distillation chamber in a relatively thin film comprising a series of protruding rib members radiating from the peak elevational level of the distillation chamber and a series of protruding rib members converging toward the outlet means and means for conducting a heat medium to and from the heat chamber.

4. In a device of the character described, a housing provided with dividing wall structure defining a filtration chamber with a distillation chamber and a heat chamber therebeneath, the said filtration chamber being provided with a passageway establishing communication between the filtration chamber and the distillation chamber for the passage of liquids to and the discharge of volatile gases and vapors from the distillation chamber, the surface of the distillation chamber being arranged at an angle to the horizontal sufficient to impel liquids thereon to flow in a common direction, filtering material in the filtration chamber, pipe means extending substantially centrally of the housing having a dividing wall therein and provided with outlet openings for the discharge of waste liquids into the center of the filtering material and for discharging volatile gases and vapors to the atmosphere, outlet means for withdrawing reclaimed liquids from the distillation chamber, means for conducting a heat medium to and from the heat chamber, means within the distillation chamber for causing liquids introduced thereinto to spread evenly over the surface in a relatively thin film and baffle means within the filtration chamber for causing liquids introduced thereinto to spread through the filtering material.

5. A device as set forth in claim 4 wherein the means for conducting a heat medium to the heat chamber is provided with automatically operable means for regulating the flow of a heat medium to the heat chamber.

6. In a device of the character described, a housing member provided with dividing wall structure defining a filtration chamber with a distillation chamber and a heat chamber respectively therebeneath, conducting means for delivering waste liquids to the filtration chamber and outlet means for withdrawing reclaimed liquids from the distillation chamber the said filtration chamber being provided with a passageway establishing communication between the filtration chamber and the distillation chamber, the surface of the distillation chamber being substantially flat and inclined at an angle to the horizontal sufficient to impel liquids thereon to flow toward the outlet, filtering material within the filtration chamber, means within the distillation chamber for causing liquids introduced thereinto to spread evenly over the surface of the distillation chamber in a relatively thin film comprising a series of protruding rib members and means for conducting a heat medium to and from the heat chamber.

ARNO A. BRAUN.